United States Patent

[11] 3,624,763

| [72] | Inventor | Gunter Rohr<br>Stuttgart-Kaltental, Germany |
| --- | --- | --- |
| [21] | Appl. No. | 1,000 |
| [22] | Filed | Jan. 6, 1970 |
| [45] | Patented | Nov. 30, 1971 |
| [73] | Assignee | Union Special Maschinenfabrik GmbH<br>Stuttgart, Germany |
| [32] | Priority | Jan. 16, 1969 |
| [33] | | Germany |
| [31] | | P 19 02 000.9 |

[54] LOOP TAKER LUBRICATION SYSTEM
9 Claims, 3 Drawing Figs.

[52] U.S. Cl. .................................... 184/6.15,
112/256, 184/6.26
[51] Int. Cl. ........................................ D05b 71/02
[50] Field of Search .......................... 184/6 M, 6
Z, 6; 112/256

[56] References Cited
UNITED STATES PATENTS

| 2,079,568 | 5/1937 | Christensen.................. | 184/6 M X |
| --- | --- | --- | --- |
| 2,300,388 | 10/1942 | Parry.......................... | 184/6 M X |
| 2,317,240 | 4/1943 | Zeier.......................... | 184/6 M |
| 2,318,447 | 5/1943 | Zonis et al. ................. | 112/256 X |
| 2,376,216 | 5/1945 | Wertz.......................... | 184/6 Z |
| 2,447,987 | 8/1948 | Parry.......................... | 112/256 |
| 2,702,093 | 2/1955 | Sherrill........................ | 184/6 Z |

*Primary Examiner*—Manuel A. Antonakas
*Attorney*—Diller, Brown, Ramik & Holt

ABSTRACT: Apparatus for lubricating a loop taker raceway in a sewing machine wherein a current of air forces an oil mist through a hollow loop taker shaft and deflects the air laterally at the inlet port of the shaft.

INVENTOR
GUNTER ROHR
ATTORNEYS 3,624,763

LOOP TAKER LUBRICATION SYSTEM

BACKGROUND OF THE INVENTION

1. Field of the Invention

The invention relates to a loop taker lubrication system for sewing machines of the type having a loop taker riding in a loop taker raceway and including a loop taker shaft.

2. Description of the Prior Art

In high-speed lockstitch sewing machines lubricant is oftentimes delivered to the loop taker through the hollow loop taker shaft. In such cases, the lubricant must be fed into the loop taker shaft against centrifugal force. It is therefore desirable to provide a control over the feeding of the lubricant so as to make adjustments regarding the quantity of lubricant according to existing conditions.

There are many suggestions for this type of loop taker lubrication. In prior art devices, the lubricant will either be forced into the hollow loop shaft by means of mechanically movable parts, or capillary means filled with lubricant are brought into contact with the loop taker shaft so that the shaft and other parts rotating therewith wipe off lubricant from the capillary means.

Other prior art loop taker lubrication systems suggest the feeding of lubricant into the loop taker shaft by means of an incline pressure and the quantity of the lubricant to be delivered is regulated by valve means responding to variations in the number of revolutions of the shaft.

Prior art lubrication systems generally are extremely bulky, expensive, not always reliable and difficult to regulate.

One example of a sewing machine having a loop taker requiring lubrication is shown in Wood, U.S. Pat. No. 2,431,292.

SUMMARY OF THE INVENTION

It is an object of the present invention to provide a loop taker lubrication system which ensures a reliable and sensitive control for the delivery of lubricant at minimum effort.

The above object is accomplished by directing an air current toward the intake opening of the loop taker shaft whereby the air current serves as a carrier medium for the lubricant.

A further feature of the invention is in the arrangement of a separator means located directly in front of an inlet port of the loop taker shaft for deflecting air laterally of the shaft.

In a preferred embodiment, a rotary radial fan having a rotating intake opening is mounted on the loop taker shaft adjacent the inlet port end thereof.

A further feature of the invention is the provision of a regulating device for varying the cross section of the intake opening of the separator means.

The invention also provides an axially displaceable cone disposed in the intake opening of the radial fan for varying the cross section thereof. A conical end of an axially displaceable bolt extends into the intake opening and an adjusting shaft cooperates with the bolt to provide axially shifting thereof.

Another feature of the invention is the provision of a fin or rib provided above the displaceable bolt for condensing oil mist and causing droplets of oil to drip upon the bolt.

By using an air current as the carrier medium for the lubricant, lubrication of the loop taker becomes extremely simple. There is no need for the arrangement of movable parts cooperating with the loop taker shaft to force the lubricant therethrough. The lubricant laden current enables an extremely fine adjustment which can be accomplished by choking the air current. In addition, there are no narrow channels that are likely to become clogged with resinous substances, thereby substantially reducing maintenance problems.

With the above and other objects in view that will hereinafter appear, the nature of the invention will be more clearly understood by reference to the following detailed description, the appended claimed subject matter and the several views illustrated in the accompanying drawing.

DESCRIPTION OF THE PREFERRED EMBODIMENTS

Figure 1:
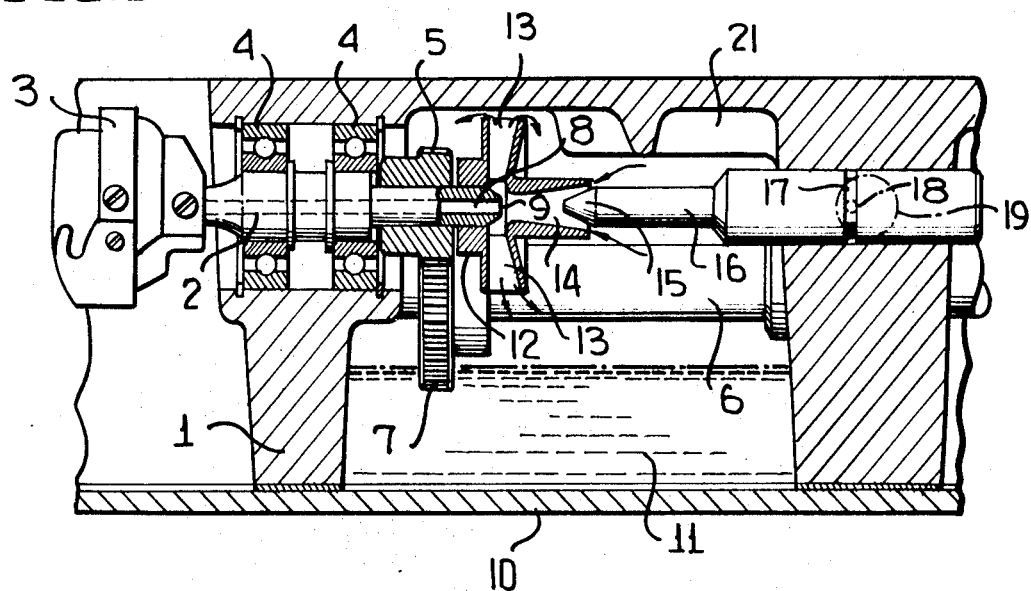
FIG. 1 is a fragmentary vertical section of a sewing machine base taken along the loop taker drive shaft.

A sewing machine base 1 is provided with antifriction bearings 4 for journaling a loop taker shaft 2 for driving a conventional loop taker 3.

A machine shaft 6 is driven in a conventional manner for driving the loop taker shaft 2 through a pinion 5 and a drive gear 7. A concentric bore 8 is formed within the loop taker shaft 2 and includes an inlet port 9.

The machine base 1 is closed at its bottom side by a cover plate 10 thereby providing an oil reservoir chamber 11 in which is generated an oil mist by causing rotating parts, such as gear 7, to be at least partially immersed in oil located in the oil reservoir chamber 11.

The oil mist created in chamber 11 is forced into the inlet port 9 by a separator means comprised of a fan 12 mounted upon the loop taker shaft 2 on the ends thereof adjacent inlet port 9.

Fan 12 is provided with an axially extending intake opening 14, the size of opening 14 being adjustable by the provision of a conical end 15 of an axially displaceable bolt 16 being located in the opening 14 in concentric relation thereto. Bolt 16 is journaled for axial displacement in the machine base 1 and includes an annular groove 17 into which engages an eccentrically arranged pin or stud 18 projecting from the end face of an adjusting shaft 19.

Figure 2:
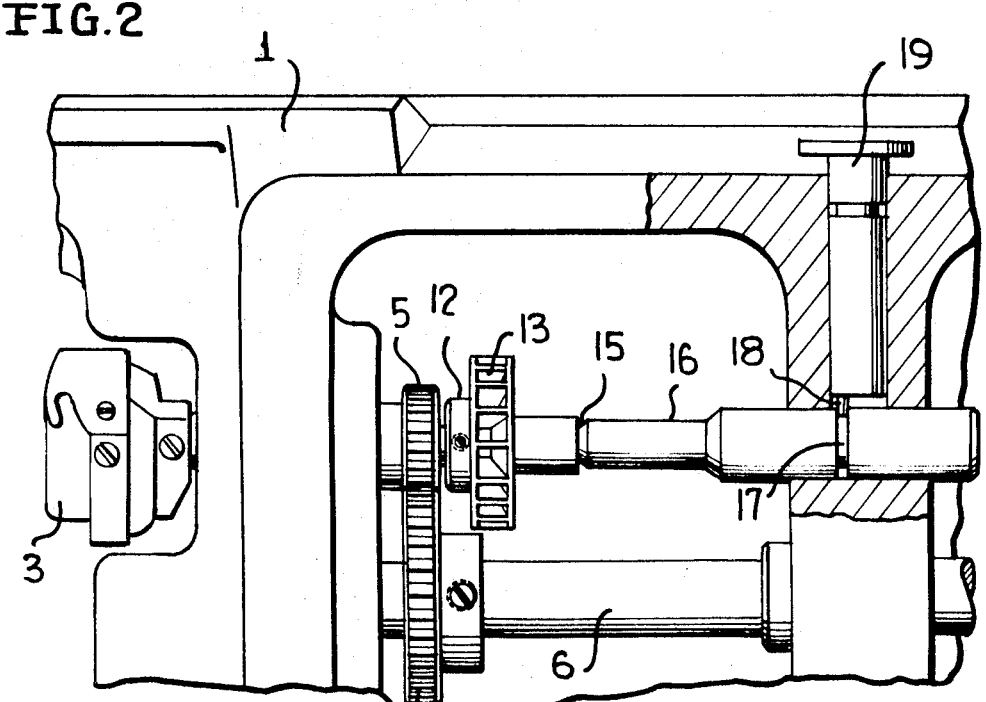
FIG. 2 is a bottom plan view of FIG. 1, partially in section, with the bottom cover removed.

In the embodiment shown in FIGS. 1 and 2, pinion 5 is rotated by gear 7 and causes rotation of the fan 12 for sucking in air and the oil mist suspended in chamber 11 above the oil level therein. The oil air mixture will drift axially toward the inlet port 9 and the oil from the mixture will be forced into the bore 8 while most of the air from a mixture will be deflected away from the inlet port 9 through the radial blades 13 of the fan 12. A rib 21 is formed as part of the machine base 1 and is located vertically above the axially displaceable bolt 16. Part of the oil mist in chamber 11 will condense upon rib 21 so that droplets of oil will drip upon bolt 16 and form a thin layer of oil thereon. This layer of oil will be slowly drawn by the flow of air toward the conical end 15 and be forced into inlet port 9 by air flowing through intake opening 14.

It will be apparent that the quantity of oil to be forced into inlet port 9 is readily controlled by varying the size of intake opening 14 by axially shifting the position of bolt 16 and the conical end 15 thereof through use of adjusting shaft 19.

Figure 3:
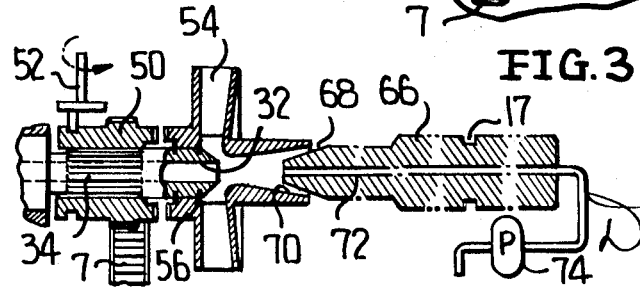
FIG. 3 is a fragmentary section of a modification wherein the loop taker shaft is driven relative to the air separator means.

A modified form of the invention is shown in FIG. 3. A loop take shaft 32, similar to loop taker shaft 2 is provided with splines 34 for cooperating with a pinion 50 which is axially shiftable thereon by an adjustment mechanism 52. A separator means comprised of a fan 54 is rotatably mounted upon loop taker shaft 32 by bearings 56. When pinion 50 is located in the position shown in FIG. 3, loop taker shaft 32 is rotatably driven by gear 7 while the fan 54 remains at rest. An axially displaceable bolt 66, corresponding to bolt 16, has a conical end 68 located within intake opening 70 of the fan 54. A bore 72 is formed in the bolt 66 to provide a passageway for a jet of air from a source of compressed air such as pump 74. In this embodiment, a venturi-tube arrangement is provided wherein an oil and air mixture is sucked into intake opening 70, the oil portion of the mixture being forced into the inlet port of loop taker shaft 32 while the air portion of the mixture is deflected laterally thereof outwardly through the radial blades in the stationary fan 54. In this manner, the stream of air passing through loop taker shaft 32 into the loop taker raceway can be subjected to rigid control either through controlling the flow of air from source 74 or varying the size of intake opening 70 by axially shifting the bolt 66 in the same manner as previously described with respect to FIGS. 1 and 2.

While preferred forms and arrangement of parts have been shown in illustrating the invention, it is to be clearly understood that various changes in details and arrangement of parts may be made without departing from the spirit and scope of the invention, as defined in the appended claimed subject matter.

I claim:

1. Lubricating apparatus for sewing machines of the type having a loop taker riding in a loop taker raceway and including a loop taker shaft, said apparatus comprising a bore formed in said loop taker shaft providing an inlet port remote from said raceway, means for creating an airborne mist of oil, means forming a current of air for moving said mist of oil axially toward said inlet port and into said bore, and separator means adjacent said inlet port for deflecting a major portion of said current of air laterally of said loop taker shaft.

2. Lubricating apparatus for sewing machines of the type having a loop taker riding in a loop taker raceway and including a loop taker shaft, said apparatus comprising a bore formed in said loop taker shaft providing an inlet port remote from said raceway, means for creating an airborne mist of oil, means forming a current of air for moving said mist of oil axially toward said inlet port and into said bore, and separator means adjacent said inlet port for deflecting air laterally of said loop taker shaft, said separator means comprising fan means mounted on said loop taker shaft.

3. Apparatus as in claim 2 wherein said fan means is fixed on said loop taker shaft, and means for rotating said fan means and said shaft.

4. Apparatus as in claim 2 including means for mounting said fan on said loop taker shaft to provide relative movement therebetween, means for rotating said loop taker shaft, and said means for forming a current of air including a source of compressed air.

5. Lubricating apparatus for sewing machines of the type having a loop taker riding in a loop taker raceway and including a loop taker shaft, said apparatus comprising a bore formed in said loop taker shaft providing an inlet port remote from said raceway, means for creating an airborne mist of oil, means forming a current of air for moving said mist of oil axially toward said inlet port and into said bore, separator means adjacent said inlet port for defecting air laterally of said loop taker shaft, said separator means including an intake opening, and regulating means for varying the size of said intake opening.

6. Apparatus as in claim 5 wherein said regulating means comprises an axially displaceable cone arranged in said intake opening, and means for moving said cone into and out of said intake opening.

7. Apparatus as in claim 6 wherein said cone is formed on one end of an axially displaceable bolt, said means for moving said cone comprising an adjusting shaft, a stud eccentrically mounted on said adjusting shaft, and a groove formed in said bolt and having said stud received therein.

8. Apparatus as in claim 6 including a rib located above said bolt for causing oil droplets from condensed oil mist to drip upon said bolt.

9. Lubrication apparatus as defined in claim 1 wherein said loop taker shaft is disposed in a chamber above an oil reservoir, and drive means connected to said loop taker shaft, said drive means being at least partially immersed in said oil reservoir for creating said airborne mist of oil in said chamber during rotation of said drive means.

* * * * *